Patented Dec. 7, 1926.

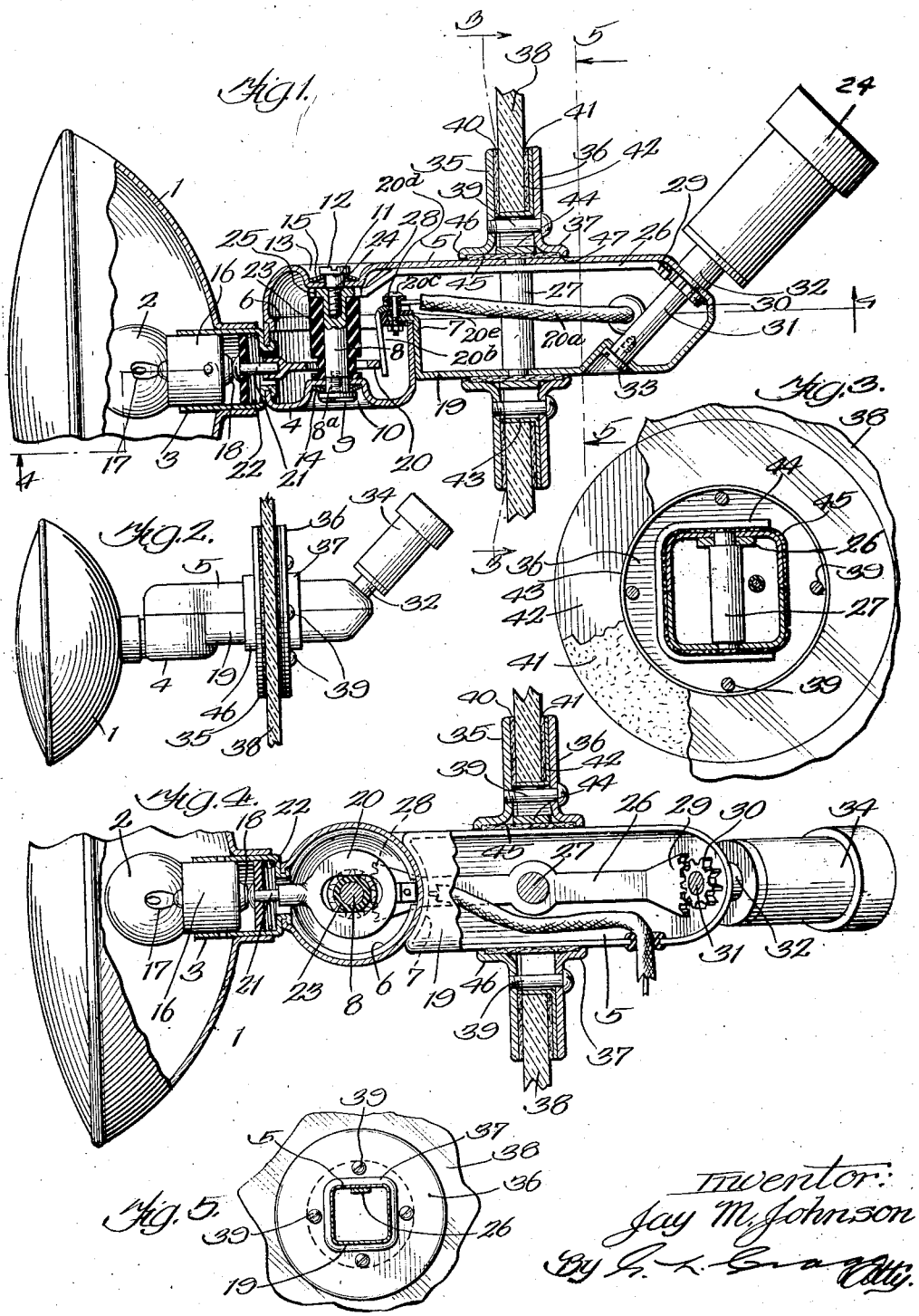

1,609,551

UNITED STATES PATENT OFFICE.

JAY M. JOHNSON, OF CHICAGO, ILLINOIS, ASSIGNOR TO GREAT LAKES AUTO PRODUCTS COMPANY, A CORPORATION OF ILLINOIS.

SPOTLIGHT.

Application filed April 17, 1923. Serial No. 632,653.

My invention relates to electric lamps and is of particular importance in connection with spot lights, though it is not to be thus limited.

The invention has for its object an improved mounting for the stem of a lamp and also an improved mounting of the lamp upon its stem whereby the lamp may have a very wide range of adjustments of its positions with respect to the support carrying it. A lamp constructed in accordance with my invention may well be adapted for assembly with an automobile wind shield, although it may also be assembled with other forms of supports without departing from the spirit of the invention.

In accordance with one feature of the invention the lamp is provided upon a suitable stem which is preferably in the form of a shell. The body of the lamp is so connected with its stem that it may be turned upon an axis transverse to the axis of the stem. The stem itself, whether or not the body of the lamp is adjustable thereon, has a mounting which permits the stem to be moved longitudinally therethrough and prevents the stem from turning thereon.

In accordance with another characteristic of the invention this mounting is assembled with a wind shield or other support which has a hole through which the stem of the lamp passes. The mounting is frictionally coupled with such support so that it, together with the lamp stem, may be turned with respect thereto. The mounting is in friction tight engagement with the wind shield or other support so that the mounting and the lamp stem are automatically held in the position to which they are turned.

The invention further provides gearing within the hollow stem or shell of the lamp and actuating means upon the shell and on one side of the wind shield or other support whereby the lamp on the other side of said support may be turned upon the lamp stem.

The invention will be fully explained by reference to the accompanying drawing in which Fig. 1 is a longitudinal sectional elevation illustrating the preferred embodiment of the invention; Fig. 2 is a side view on a smaller scale; Fig. 3 is a sectional view on line 3—3 of Fig. 1; Fig. 4 is a sectional view on line 4—4 of Fig. 1; and Fig. 5 is a view on line 5—5 of Fig. 1.

Like parts are indicated by similar characters of reference throughout the different figures.

The lamp illustrated includes a concave reflector body portion 1, an incandescent lamp 2 within and in front of the same, a shell 3 with which the lamp has bayonet pin and slot connection, and a generally cylindrical member 4 rigidly assembled with the shell 3 and desirably having its axis upright. Such a lamp is provided with and is offset with respect to a stem 5 which is preferably in the form of a hollow metallic shell divided lengthwise into sections and whose axis is perpendicular to the axis of the cylindrical portion 4. The upper end of the cylindrical member 4 is engaged by the correspondingly curved portions 6 and 7 of the stem 5 whereby the member 4 and the parts carried thereby are confined to an axis of rotation that is fixed with respect to the stem 5 and which is coincident with the axis of member 4. The stem 5 and the member 4 are maintained in hinged assembly by a bolt 8 with a screw 9, in one end thereof, the head of which rests beneath the member 4 and is received in a recess 10 formed in the bottom of the member 4. A somewhat similar bolt 11 is screwed into the other end of the bolt 8 and its head 12 is received in a recess 13 formed in the stem 5. Spring washers 14 and 15 surround the shanks of the bolts 8 and 11 respectively and are pressed upon by the heads of these bolts, the member 4 and bolt 8 being so coupled that said member may be turned with the bolts 8 and 11 which are co-axial with said member, the spring washers serving to hold the member 4 and the parts carried thereby in the position to which they are turned.

The lamp illustrated is a single pole lamp whose base is covered by a metallic sheath 16 that is connected with one terminal of the lamp filament 17 and which is grounded through the various metallic parts of the lamp structure. The end of the base of the lamp carries a contact 18 that is connected with the other terminal of the filament 17. The circuit of the lamp is completed by means of a conductor 20ª connected with the wet side of the battery at one end and with the yoke 20 at its other end, this yoke being assembled with a contact 21 which is pressed forwardly by a spring 22 into engagement with the contact 18. At its forward end the conductor is connected to the brush 20ᵇ by means of a bolt 20ᶜ piercing the shell 19 and a U-shaped insulating strip 20ᵉ. To provide complete insulation a bushing 20ᵈ, of insulating material, encircles the bolt 20ᶜ and insulates it from the brush 20ᵇ and conductor 20ᵃ. The yoke 20 is provided with a large central opening through which the bolt 8 passes together with an insulating sleeve 23 that is provided to prevent the grounded metal work of the lamp structure from having short circuiting engagement with said bolt. I do not wish to be limited, however, to a single pole lamp structure as it is obvious that the invention may be otherwise embodied.

A pinion 25 is formed integral with the upper end of the bolt 8, and a lever 26 is pivoted intermediate its length upon the reduced end of an upright shaft 27 which is assembled at its ends with the two halves of the stem 5. This lever is formed at one end into an arcuate gear 28 in mesh with the pinion 25 and at its other end it is formed into an arcuate gear 29 in mesh with an actuating pinion 30. The pinion 30 is carried upon the oblique shaft 31 that passes through the two parts of the stem 5. This shaft is formed with a shoulder 32 that engages the upper longitudinal half of the stem 5 and carries a screw 33 at the lower end thereof that engages the lower longitudinal half of said stem, the shaft 31 and the bolts 8 and 11 all co-operating to maintain the two longitudinal halves of the stem in assembly.

The gear elements 25, 26 and 30 are located within the hollow stem or shell 5 and are operable by means of the oblique handle 34 mounted upon and turning with the shaft 31. The hollow stem or shell 5 is desirably substantially square in cross section and is received within the correspondingly shaped and similarly sized openings in a mounting which is desirably composed of two discs 35, 36 which are outwardly flared adjacent the stem to form a box-like guide 37 in which the stem 5 of the lamp structure may be moved longitudinally, the shape of the openings in the ends of the box-like guide, conforming to the quadrilateral shape of the stem 5, preventing the stem from turning with respect to the mounting while permitting the stem to be adjusted longitudinally.

The discs 35 and 36 are themselves carried upon a glass windshield or other support 38 which is formed with a circular opening through which the shell or stem 5 passes, this opening being large enough to receive the stems of the clamping screws 39 that serve to maintain the discs 35, 36 in friction tight assembly with said support 38. A ring of cork 40 is interposed between the disc 35 and the support 38. Another ring of cork 41 is interposed between the remaining disc 36 and a metal washer 42, this metal washer being interposed between the cork layer 41 and the support and being formed with a tubular continuation 43 which is concentric with the discs 35 and 36 and with the circular opening in the support 38. The lamp structure is, by means of the friction producing corks 40, 41 or other layers of friction producing material, held in the position to which it may be turned with its mounting discs 35 and 36. The stem 5 is held in the position to which it is longitudinally adjusted by means of the U-shaped clip 44 which clamps a band of felt or other friction producing material 45 in friction tight engagement with the stem. The band of friction producing material 45 is held in the plane of the mounting 35, 36 by means of the shoulders 46, 47 upon the square extensions of the discs 35, 36. The clip 44 is held in the plane of the support 38 by being interposed between the body portions of the discs 35, 36.

The handle 34 is upon the chauffeur's side of the wind shield and the lamp is upon the front side of such shield. The lamp may be adjusted forwardly and backwardly from the chauffeur's seat by pushing or pulling upon the stem 5. It may be turned upon the axis of the stem by exerting turning action upon said stem to cause the discs 35 and 36 to turn upon the wind shield 38. The lamp may be moved in a horizontal plane by turning the handle 34. When the lamp structure is not in use the stem 5 may be pushed as far forward as possible to bring the handle 34 as close as may be to the wind shield in order to have it out of the way as much as possible. The bodily position of the lamp with respect to its mounting may thus be adjusted forwardly and backwardly and after having been suitably determined the lamp may be swung in a horizontal plane and also in a vertical plane whereby the light therefrom may be directed to any selected part of the road.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a hollow stem, of a lamp mounted on one end thereof for movement relative to the same, a handle mounted on the opposite end of said stem for movement relatively thereto, a lever pivoted intermediate its ends within said stem, and connections between the ends of said lever and the handle and lamp respectively whereby the movement of the former may be imparted to the latter.

2. The combination with a hollow stem, of a lamp mounted at one end thereof for movement relative to the same, a handle mounted at the opposite end of said stem for movement relatively thereto, a lever pivoted within said stem, an arcuate gear at each end of said lever, and pinions connected with the handle and with the lamp, and meshing with said arcuate gears, whereby the movement of the handle may be imparted to the lamp.

3. The combination with a hollow stem, of a lamp mounted at one end thereof for movement relative to the same, a handle mounted at the opposite end of said stem for movement relatively thereto, a lever pivoted medially of its length within said stem, an arcuate gear at each end of said lever, and pinions connected with the handle and with the lamp, and meshing with said arcuate gears, whereby the movement of the handle may be imparted to the lamp.

4. The combination with a stem of angular cross area, of a bearing internally shaped to embrace and fit said stem so as to hold the same from rotary movement but permitting reciprocating movement, means for supporting said bearing and stem for rotary movement in unison relatively to said supporting means, a lamp mounted in one end of said stem, an operating handle mounted in the other end of said stem, and means in said stem operatively connecting said handle and lamp.

5. The combination with a support, and a stem of angular cross area, of a lamp mounted at one end of said stem for relative movement, a handle mounted at the opposite end of said stem for movement relatively thereto, a lever pivoted intermediate its ends within the stem, connections between the ends of said lever and the handle and lamp respectively whereby the movement of the former may be imparted to the latter, and a mounting for said stem shaped interiorly to fit the angular configuration of said stem and shaped circular exteriorly to fit a similarly shaped opening in said support, whereby to maintain said stem at a fixed angle to said support and to permit of its rotary and reciprocating movement relatively to said support.

6. The combination with a shell, of a bearing embracing said shell adapted to hold said shell from rotary movement relatively to said bearing, means for supporting said bearing and shell for rotary movement in unison relatively to said supporting means, a lamp pivoted to one end of said shell, a handle pivoted to the opposite end thereof, a lever within said shell having an arcuate gear at each of its ends, and pinions connected with said handle and said lamp, and meshing with arcuate gears aforesaid, whereby the movement of the handle will swing the lamp about its pivot.

In witness whereof, I hereunto subscribe my name this 21st day of March, A. D. 1923.

JAY M. JOHNSON.